(12) United States Patent  
Tawada (10) Patent No.: US 9,141,317 B2  
(45) Date of Patent: Sep. 22, 2015

(54) IMAGE FORMING APPARATUS

(71) Applicant: Sharp Kabushiki Kaisha, Osaka-shi, Osaka (JP)

(72) Inventor: Masaki Tawada, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/147,627

(22) Filed: Jan. 6, 2014

(65) Prior Publication Data

US 2014/0192380 A1 Jul. 10, 2014

(30) Foreign Application Priority Data

Jan. 10, 2013 (JP) ................ 2013-002439

(51) Int. Cl.
| | |
|---|---|
| *G06F 3/12* | (2006.01) |
| *H04N 1/00* | (2006.01) |
| *H04N 1/32* | (2006.01) |
| *G06K 15/00* | (2006.01) |

(52) U.S. Cl.
CPC .............. *G06F 3/1236* (2013.01); *G06F 3/122* (2013.01); *G06F 3/1271* (2013.01); *G06F 3/1285* (2013.01); *H04N 1/00445* (2013.01); *H04N 1/32101* (2013.01); *G06F 3/1212* (2013.01); *H04N 2201/0094* (2013.01); *H04N 2201/325* (2013.01); *H04N 2201/3273* (2013.01); *H04N 2201/3274* (2013.01)

(58) Field of Classification Search
CPC ............ G06F 3/1237; G06K 15/1886; G06K 15/405; G06K 15/4045
See application file for complete search history.

(56) References Cited

U.S. PATENT DOCUMENTS

| | | | | |
|---|---|---|---|---|
| 7,633,639 | B2 * | 12/2009 | Ohishi et al. | 358/1.15 |
| 2005/0168763 | A1 * | 8/2005 | Higuchi et al. | 358/1.13 |
| 2008/0151299 | A1 * | 6/2008 | Takahata | 358/1.15 |

FOREIGN PATENT DOCUMENTS

| | | |
|---|---|---|
| JP | 2002-232836 A | 8/2002 |
| JP | 2006-295256 A | 10/2006 |
| JP | 2010-4192 A | 1/2010 |

* cited by examiner

*Primary Examiner* — Dov Popovici  
(74) *Attorney, Agent, or Firm* — Keating & Bennett, LLP (57) ABSTRACT

The image forming apparatus includes an image processing portion for creating image data of a document read by an image reading portion and a communication portion for transmitting the created image data to a server or cloud, and obtains the image data saved in the server or the like to perform required processing, in which a reduced image generating portion for creating reduced image data based on the created image data, a main storage portion for linking the reduced image data and a saving destination of the data serving as original thereof for storage, and a display portion for displaying an operation screen are included, and the reduced image data stored in the main storage portion is displayed on the display portion to select image data for which the required processing is performed.

2 Claims, 11 Drawing Sheets

| REDUCED FILE NAME | SAVING PATH | SAVED FILE NAME | SAVED TIME AND DATE | DOCUMENT SIZE | IMAGE RESOLUTION | COLOR/ MONOCHROME | NUMBER OF PAGES |
|---|---|---|---|---|---|---|---|
| T1 | T2 | T3 | T4 | T5 | T6 | T7 | T8 |
| 20120810_12345678_001_small.jpg | \\xxx.xxx.xxx.xxx\share\document\ | 20120810_12345678_001.jpg | 20120810 1443 | A4 | 600x600dpi | COLOR | 1 |
| 20120810_12345678_002_small.jpg | \\xxx.xxx.xxx.xxx\share\document\ | 20120810_12345678_002.jpg | 20120810 1534 | A4 | 600x600dpi | MONOCHROME | 4 |
| 20120811_12345678_001_small.jpg | \\xxx.xxx.xxx.xxx\share\document\ | 20120811_12345678_001.jpg | 20120810 1955 | B4 | 600x300dpi | COLOR | 2 |

FIG.14

IMAGE FORMING APPARATUS

CROSS-NOTING PARAGRAPH

This non-provisional application claims priority under 35 U.S.C. §119(a) on Patent Application No. 2013-002439 filed in JAPAN on Jan. 10, 2013, the entire contents of which are hereby incorporated herein by reference.

FIELD OF THE INVENTION

The present invention relates to an image forming apparatus which temporarily saves image data that a document is read in an external storage device, and when performing processing of printing, editing or the like, receives the image data to be processed from the external storage device.

BACKGROUND OF THE INVENTION

An image forming apparatus which reads an image of a document to generate image data and performs processing of printing or the like for the image data generally has a mechanism for temporarily saving the image data before processing in the apparatus. In the case of this form, however, in an image forming apparatus such as a low-price model that is not provided with a large storage, it is impossible to store large amount of image data.

Thus, there is a method that an external storage device such as cloud/server connected through a network serves as a saving destination of image data. In the case of this form, however, the image data is not able to be confirmed without accessing the above-described external storage device through the network.

Japanese Laid-Open Patent Publication No. 2006-295256 discloses as follows, as to the technology for using an external storage device connected through a network as a saving destination of image data. That is, in a technology disclosed in Japanese Laid-Open Patent Publication No. 2006-295256, a digital camera transmits created image data to a server through a wireless LAN (Local Area Network) for storage, a server creates a thumbnail image based on the received image data, and when receiving a browsing request of image data from a user terminal, transmits the thumbnail image. When the user terminal displays the received thumbnail image, a user is able to select the target image data.

However, when the technology disclosed in Japanese Laid-Open Patent Publication No. 2006-295256 is applied to an image forming apparatus so that a thumbnail image received from the external storage device through the network is displayed by the image forming apparatus in response to a user request to cause the user to select image data to be processed by the image forming apparatus, time from the user request till when the thumbnail is displayed becomes long, thus lacking user-friendliness.

SUMMARY OF THE INVENTION

The present invention aims to provide an image forming apparatus which temporarily saves image data that a document is read in an external storage device before processing, and is capable of selecting image data to be processed promptly from image data saved in the external storage device without lacking user-friendliness.

An object of the present invention is to provide an image forming apparatus which includes a reading portion for reading a document, an image processing portion for creating image data of the read document, and a communication portion for transmitting the created image data to an external storage device connected through a network for saving, and obtains the image data saved in the external storage device in response to a user operation to perform required processing, wherein a reduced image generating portion for creating reduced image data based on the created image data, a storage portion for linking the reduced image data with at least a saving destination of the image data serving as original of the reduced image data for storage, and a display portion for displaying an operation screen are included, and the reduced image data stored in the storage portion is displayed on the display portion to select image data for which the required processing is performed.

Another object of the present invention is to provide the image forming apparatus, wherein the required processing is printing processing.

Another object of the present invention is to provide the image forming apparatus, wherein the required processing is edit processing.

Another object of the present invention is to provide the image forming apparatus, wherein the reduced image processing portion creates reduced image data based on image data for which the edit processing is performed, the communication portion transmits the image data for which the edit processing is performed to the external storage device for saving, and the reduced image storage portion links the reduced image data which is created and a saving destination of the image data for which the edit processing is performed serving as original of the reduced image data for storage.

Another object of the present invention is to provide the image forming apparatus, wherein whether or not to overwrite is selectable when the image data for which the edit processing is performed and reduced image data thereof are saved and stored.

Another object of the present invention is to provide the image forming apparatus, wherein printing processing is performed on the image data that has been subjected to the edit processing.

Another object of the present invention is to provide the image forming apparatus, wherein a file name when the image data is saved in the external storage device is generated to be unique.

Another object of the present invention is to provide the image forming apparatus, wherein the reduced image data and the image data saved in the external storage device are deleted in response to a user operation.

PREFERRED EMBODIMENTS OF THE INVENTION

Figure 1:
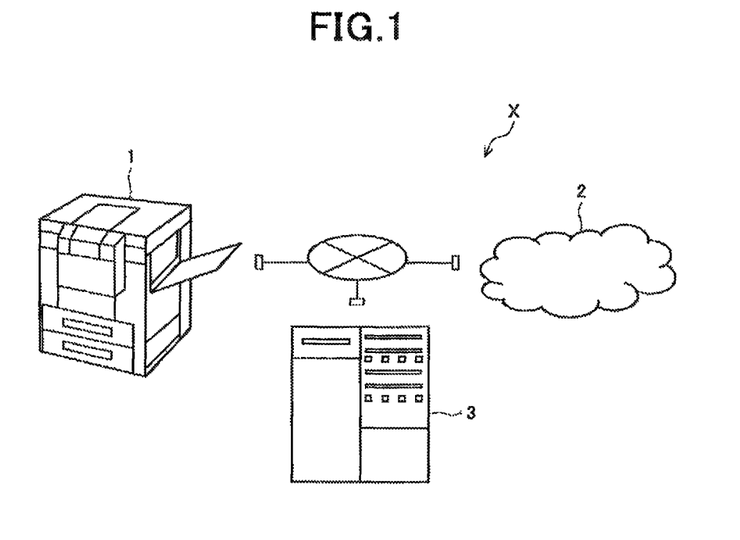
FIG. 1 is a view showing an example of a system including an image forming apparatus of the present invention.

FIG. 1 is a view showing an example of a system including an image forming apparatus of the present invention.

A system X in FIG. 1 is formed by connecting an image forming apparatus 1 and external storage devices such as cloud 2 and a server 3 through a network. In this system X, the image forming apparatus 1 causes the external storage device such as the cloud 2 or the server 3 to temporarily save image data created by reading from a document, and when performing processing of printing, editing or the like, receives data selected to be processed by a user among saved image data from the corresponding external storage device at a saving destination. The image forming apparatus 1 is characterized in the structure for the user to select image data to be processed.

Figure 2:
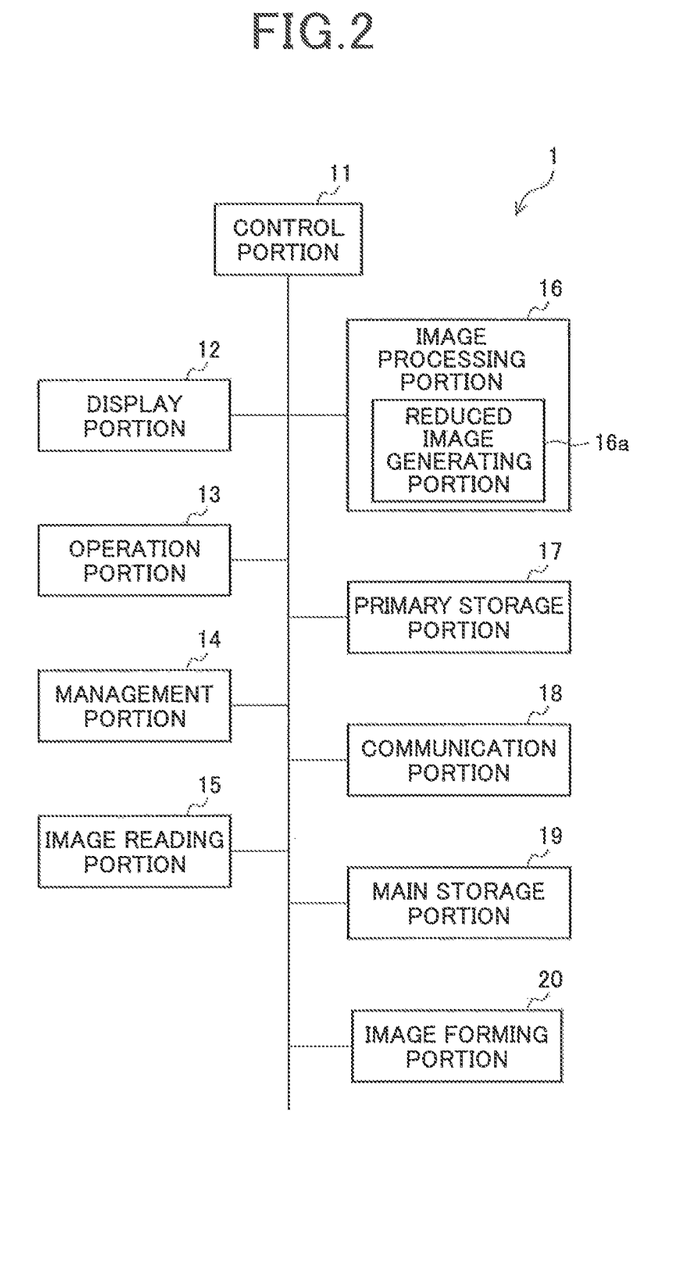
FIG. 2 is a block diagram showing a structure example of the image forming apparatus of FIG. 1.

FIG. 2 is a block diagram showing a structure example of the image forming apparatus 1 of FIG. 1.

The image forming apparatus 1 is, for example, a multi-functional peripheral having a copy function and a scan function, and is provided with, as illustrated in FIG. 2, a control portion 11, a display portion 12, an operation portion 13, a management portion 14, an image reading portion 15, an image processing portion 16, a primary storage portion 17, a communication portion 18, a main storage portion 19, and an image forming portion 20.

The control portion 11 controls each portion of the image forming apparatus 1 by executing a computer program stored in the management portion 14 described below, and is composed of, for example, a microcomputer having a CPU (Central Processing Unit), a ROM (Read Only Memory), a RAM (Random Access Memory) and the like therein.

The display portion 12 displays an operation screen and the like, and is composed of, for example, a display panel such as a small-type LCD (Liquid Crystal Display).

The operation portion 13 receives an operation from the user, and is composed of a touch panel, an operation key and the like provided on a front face of the display portion 12.

The management portion 14 is for storing management information for managing processing performed by the image forming apparatus 1 (various control information) and a computer program executed by the control portion 11, and is composed of an EPROM (Erasable Programmable Read Only Memory) and the like.

The image reading portion 15 reads an image of a document, and is composed of an automatic document reading device and the like.

The image processing portion 16 performs various image processing such as image processing for creating image data based on an image read by the image reading portion 15. A reduced image generating portion 16a of the image processing portion 16 will be described below.

The primary storage portion 17 accumulates image data created by the image processing portion 16, and is composed of a RAM (Random Access Memory).

The reduced image generating portion 16a of the image processing portion 16 generates, based on image data accumulated in the primary storage portion 17, reduced image data for displaying a reduced image showing an outline of the image data on the display portion 12 as will be described below. The reduced image is, for example, a thumbnail image, and size such as resolution thereof may be defined in advance by the user through the operation portion 13 or may be determined based on information stored in the management portion 14 as an initial setting.

The communication portion 18 is for communicating with the external storage devices such as the cloud 2 and the server 3 of FIG. 1 through the network, and transmits image data stored in the primary storage portion 17 to the external storage device for saving. The transmitted image data is deleted from the primary storage portion 17.

The main storage portion 19 is for storing various information/data, is composed of a hard disk drive and the like, and stores reduced image data generated by the reduced image generating portion 16a by linking the data with information of a saving destination of the original image data. The information of the saving destination is, for example, the information of a file name at the saving destination of the image data and the path information to the saving destination.

As a method for storing the data and information by linking with each other, there is a method for using a detailed information table in which, various information such as information of a saving destination and information of a file name of reduced image data thereof are described for each image data saved in the external storage device.

Figure 3:
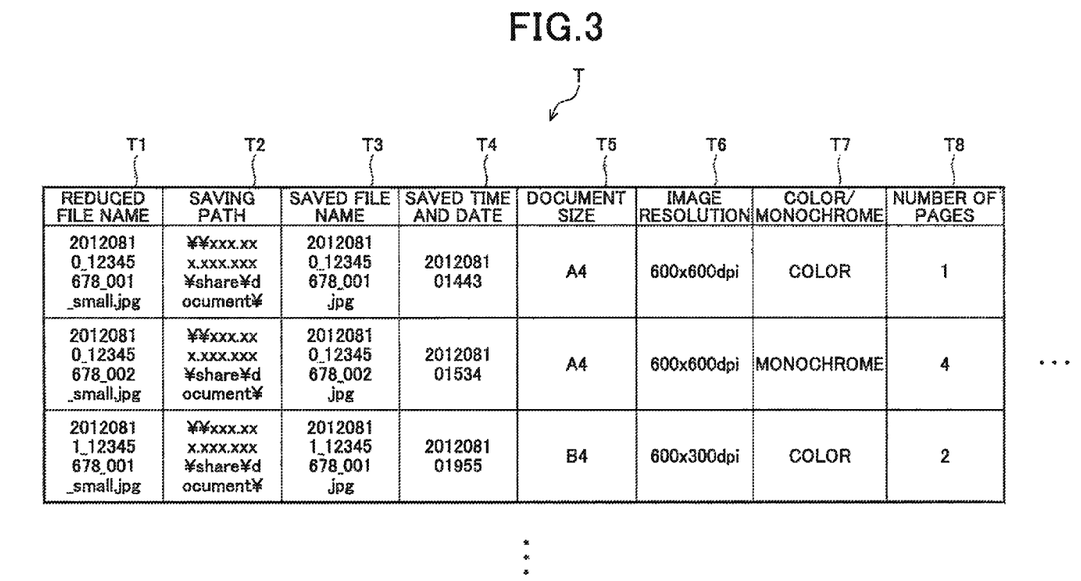
FIG. 3 is a view showing an example of a detailed information table.

FIG. 3 is a view showing an example of a detailed information table.

In a detailed information table T of FIG. 3, information of a file name of reduced image data T1 of the data, path information of a saving destination T2 of the data, and saved filename information T3 are described for each image data saved in the external storage device, and further, saved time and date information T4, document size information T5, image resolution information T6, reading mode information showing color or monochrome T7, and information of the number of pages of a document T8 are described as the information of the original image data.

The following description further explains FIG. 2.

The image forming portion 20 is for performing printing based on image data received from the external storage device, and is composed of a laser scanning unit and the like.

Note that, processing performed on image data in the image forming apparatus 1 includes, in addition to printing, "edit" for processing image data in response to a user operation through the operation portion 13 and "delete" for deleting the image data.

In the image forming apparatus 1 having the structure as described above, image data received from the external storage devices for performing processing of printing, editing or the like is selected by the following method.

That is, in the image forming apparatus 1, a reduced image based on reduced image data stored in the main storage portion 19 is displayed on the display portion 12. In response, the user selects a desired reduced image through the operation portion 13.

After the selection, based on information of the saving destination linked with the selected reduced image data, the image forming apparatus 1 receives image data to be processed from the corresponding external storage device through the communication portion 18.

As described above, image data with large data quantity is saved in the external storage device such as the cloud or the server, and only reduced image data with small data quantity is stored in the image forming apparatus 1, and therefore, it is possible to built the image forming apparatus with an unexpensive and small capacity built-in storage device. Moreover, since reduced image data showing an outline of image data is stored not in the external storage device but in the image forming apparatus 1, it is possible to display a reduced image promptly, thereby preventing the operator from feeling discomfort.

Figure 4:
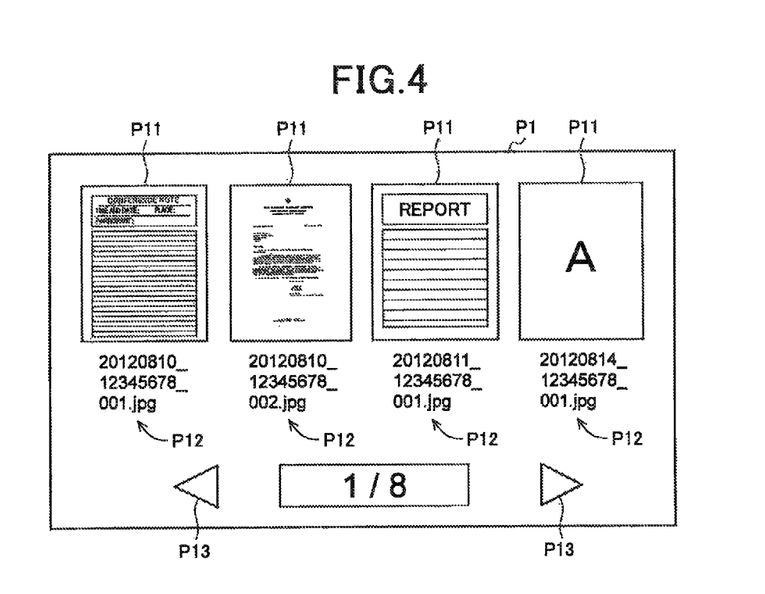
FIG. 4 is a view showing an example of a selection screen displayed on a display portion, when a user selects an image file to be processed.

FIG. 4 is a view showing an example of a selection screen displayed on the display portion 12, when a user selects an image file to be processed.

On a selection screen P1 of FIG. 4, four reduced images P11 based on reduced image data stored in the main storage portion 19 are shown as well as respective file names P12 of respective images are shown.

In the image forming apparatus 1, in a case where there are large amount of reduced image data stored in the main storage portion 19, in order to prevent that the content of reduced images becomes unclear when all reduced images are displayed on one screen or the like, it is also possible to decrease the number of reduced images displayed on one screen and display by dividing into several pages. In this case, when the user operates a page switch button P13, it is possible to select a page in which a desired reduced image is displayed.

Figure 5:
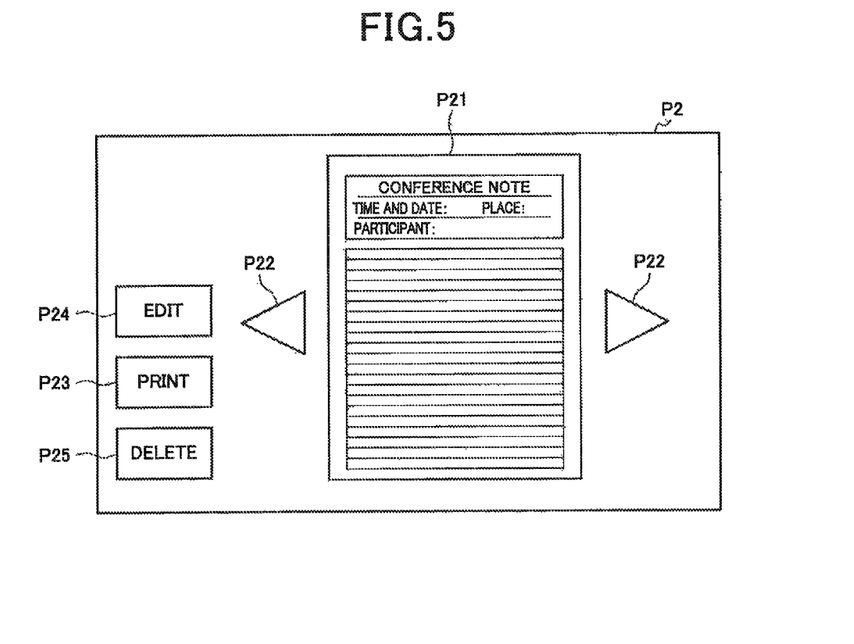
FIG. 5 is a view showing an example of a screen displayed on the display portion, when a reduced image shown on the selection screen of FIG. 4 is selected.

FIG. 5 is a view showing an example of a screen displayed on the display portion 12, when the reduced image P11 shown on the selection screen P1 of FIG. 4 is selected.

On a screen P2 of FIG. 5, an image P21 in which the reduced image selected on the selection screen P1 of FIG. 4 is adjusted according to a size of a display area of the display portion 12 is shown and a change button P22 for changing a processing target is shown.

Moreover, on the screen P2, a "print" button P23, an "edit" button P24, and a "delete" button P25 for selecting a processing method in the image forming apparatus 1 are shown.

Figure 6:
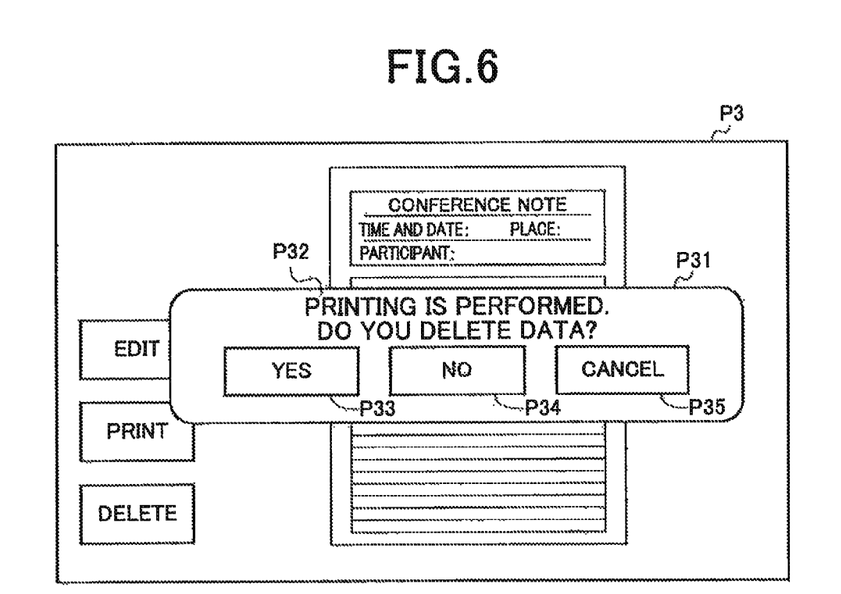
FIG. 6 is a view showing an example of a screen displayed when a "print" button on the screen of FIG. 5 is operated.

FIG. 6 is a view showing an example of a screen displayed when the "print" button P23 on the screen P2 of FIG. 5 is operated.

When the "print" button P23 on the screen P2 of FIG. 5 is operated, the image forming apparatus 1 refers to the detailed information table T of FIG. 3, and receives image data through the communication portion 18 to save the image data in the primary storage portion 17 based on information of the saving destination linked with the reduced image (reduced image data) which is being displayed. Concurrently, the image forming apparatus 1 displays, on the display portion 12, a screen P3 including a deletion confirm dialogue P31 for confirming whether or not to delete image data to be printed after printing as shown in FIG. 6.

In the deletion confirm dialogue P31, a message P32 for confirming whether or not to delete as described above, an "yes" button P33, a "no" button P34, and a "cancel" button P35 are shown.

When the "yes" button P33 is operated, in the image forming apparatus 1, after performing printing processing at the image forming portion 20 based on the image data which is received from the external storage device and stored in the primary storage portion 17, the image data is deleted from the primary storage portion 17 as well as from the external storage device at the saving destination. At this time, a reduced image of the image data, that is, reduced image data and information linked with the reduced image data are also deleted from the main storage portion 19.

When the "no" button P34 is operated, in the image forming apparatus 1, only printing processing at the image forming portion 20 and image data deletion processing from the primary storage portion 17 are executed among the above processing executed when "yes" button P33 is operated.

When the "cancel" button P35 is operated, the image forming apparatus 1 displays the screen P2 of FIG. 5 again on the display portion 12 without performing printing processing at the image forming portion 20. Note that, in this case, image data stored in the primary storage portion 17 may be deleted from the primary storage portion 17 at a stage where the above-described button P35 is operated, or may be deleted after subsequent printing processing or the like.

Figure 7:
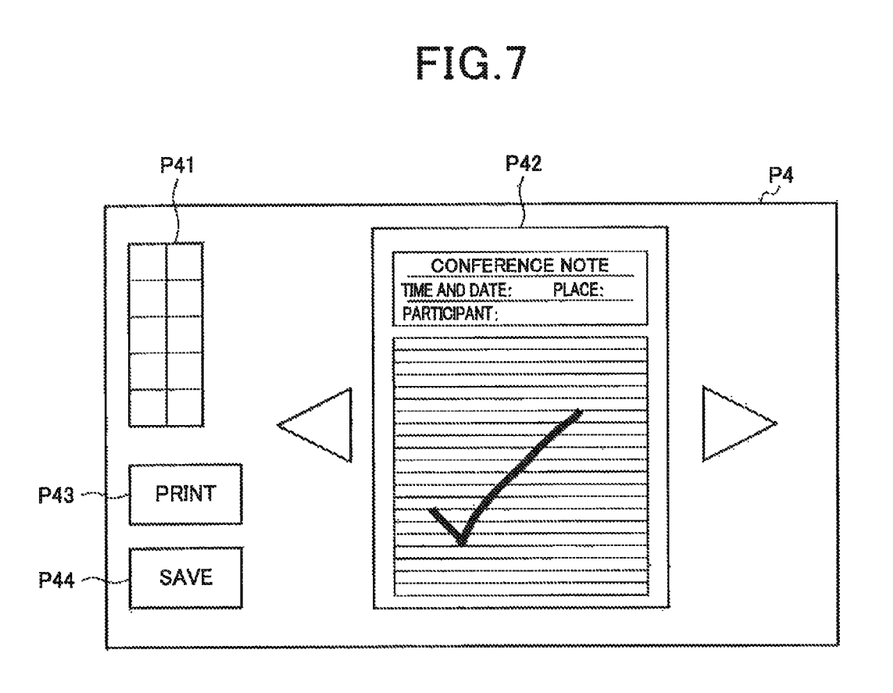
FIG. 7 is a view showing an example of a screen displayed when an "edit" button on the screen of FIG. 5 is operated.

FIG. 7 is a view showing an example of a screen displayed when the "edit" button P24 on the screen P2 of FIG. 5 is operated.

Note that, it is assumed here that at a stage where the "edit" button P24 on the screen P2 of FIG. 5 is operated, the image forming apparatus 1 refers to the detailed information table T of FIG. 3, and receives image data of the saving destination linked with the reduced image (reduced image data) which is being displayed through the communication portion 18 to save in the primary storage portion 17.

On a screen P4 of FIG. 7, an edit palette P41 for editing image data is shown.

When an edit operation is performed using the edit palette P41 or the like, in the image forming apparatus 1, the image processing portion 16 creates an edited image that an edit operation by the user is applied to the image P21 of FIG. 5, based on the corresponding image data which is received from the external storage device and stored in the primary storage portion 17. On the screen P4, an edited image P42 as such is shown and preview of the edit result is displayed. The edit content is stored in the primary storage portion 17.

Moreover, on the screen P4, a "print" button P43 for printing edited image data, and a "save" button P44 for saving the edited image data without performing printing are shown.

Figure 8:
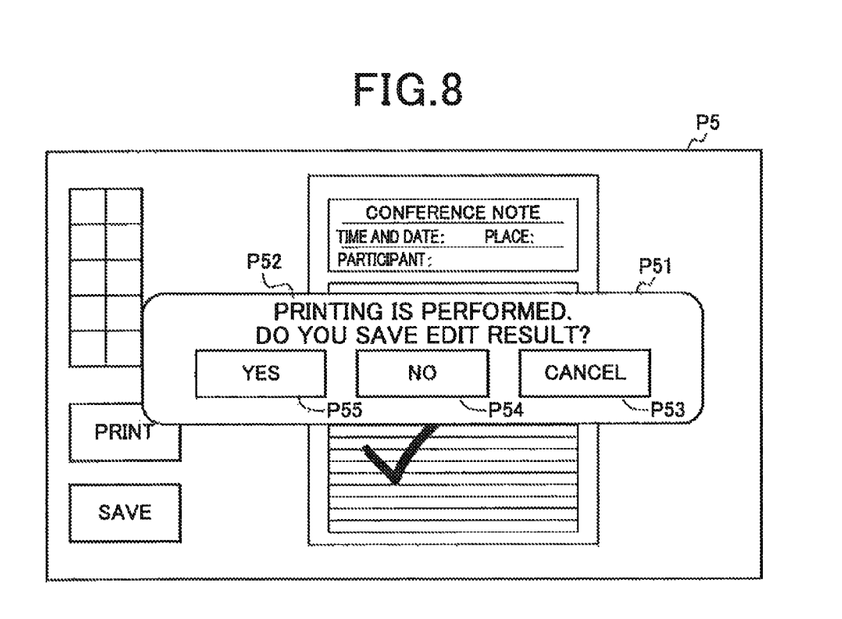
FIG. 8 is a view showing an example of a screen displayed when a "print" button on the screen of FIG. 7 is operated.

FIG. 8 is a view showing an example of a screen displayed when the "print" button P43 on the screen P4 of FIG. 7 is operated.

When the "print" button P43 on the screen P4 of FIG. 7 is operated, the image forming apparatus 1 displays, on the display portion 12, a screen P5 including a saving confirm dialogue P51 for confirming whether or not to save the edit result after printing as shown in FIG. 8.

In the saving confirm dialogue P51, a message P52 for confirming whether or not to save, described above, a "cancel" button P53, a "no" button P54, and an "yes" button P55 are shown.

When the "cancel" button P53 is operated, the image forming apparatus 1 returns to the previous state by performing processing such as displaying the screen P4 of FIG. 7 again on the display portion 12 without performing printing processing at the image forming portion 20.

When the "no" button P54 is operated, in the image forming apparatus 1, the image processing portion 16 generates data combining the edit content and the original image data stored in the primary storage portion 17, and based on the image data, printing processing is performed at the image forming portion 20. Thereafter, the edit content and the original image data stored in the primary storage portion 17 are deleted from the primary storage portion 17.

Figure 9:
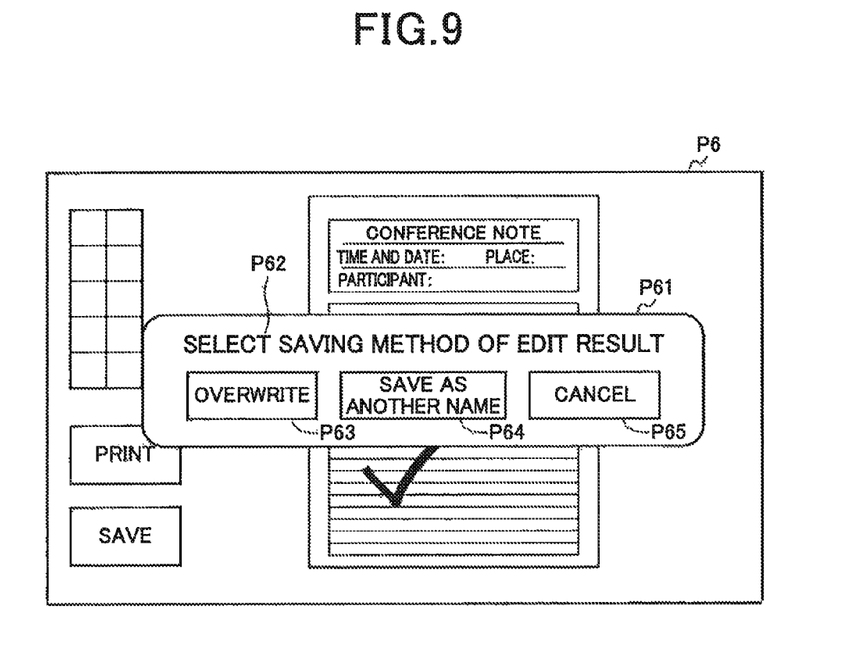
FIG. 9 is a view showing an example of a screen displayed when a "save" button on the screen of FIG. 7 or an "yes" button on the screen of FIG. 8 is operated.

FIG. 9 is a view showing an example of a screen displayed when the "save" button P44 on the screen P4 of FIG. 7 or the "yes" button P55 on the screen P5 of FIG. 8 is operated.

When the "save" button P44 on the screen P4 of FIG. 7 or the "yes" button P55 on the screen P5 of FIG. 8 is operated, the image forming apparatus 1 displays, on the display portion 12, a screen P6 including a saving method selection dialogue P61 for selecting a method for saving the edit result as shown in FIG. 9.

In the saving method selection dialogue P61, a message P62 for prompting selection of a method for saving the edit result as described above, an "overwrite" button P63, "save as another name" button P64, and a "cancel" button P65 are shown.

When the "overwrite" button P63 is operated, in the image forming apparatus 1, the image processing portion 16 newly generates reduced image data based on the data as well as generating data combining the edit content and the original image data stored in the primary storage portion 17. The image forming apparatus 1 then saves these generated data by overwriting current reduced image data stored in the main storage portion 19 and image data saved in the external storage device.

When the "save as another name" button P64 is operated, the image forming apparatus 1 generates data combining the edit content and the original image data stored in the primary storage portion 17 and new reduced image data in the same manner as described above. The image forming apparatus 1 then transmits the above-described combining data to the external storage device through the communication portion 18 to save separately from the original, and stores the new reduced image data separately in the main storage portion 19 by linking with new information of a saving destination.

When the "cancel" button P65 is operated, the image forming apparatus 1 displays the screen P4 of FIG. 7 or the screen P5 of FIG. 8 on the display portion 12 again and is returned to the previous state.

Note that, when the "delete" button P25 of FIG. 5 is operated, the image forming apparatus 1 refers to the detailed information table T of FIG. 3, and deletes the image data at the saving destination linked with the reduced image (reduced image data) which is being displayed from the external storage device. At this time, the reduced image which is selected, that is, reduced image data and information linked with the data are also deleted from the main storage portion 19.

Figure 10:
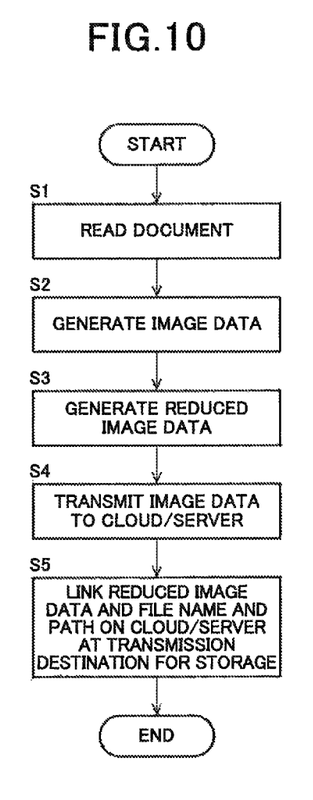
FIG. 10 is a flowchart explaining an example of a flow when an image is read in the image forming apparatus of FIG. 2.

FIG. 10 is a flowchart explaining an example of a flow when an image is read in the image forming apparatus 1 of FIG. 2.

As illustrated, the image forming apparatus 1, reads an image of a document at the image reading portion 15 (step S1), then, generates image data at the image processing portion 16 based on the read image (step S2), and then generates reduced image data at the reduced image generating portion 16a based on the generated image data (step S3). The image forming apparatus 1 then transmits the image data to the external storage device through the communication portion 18 (step S4), and stores the reduced image data in the main storage portion 19 by linking with a file name and path information in the external storage device at a transmission destination, that is, a saving destination (step S5).

FIGS. 11 to 14 are flowcharts explaining an example of a flow when image data to be printed or edited is selected in response to a user operation to perform printing, editing or the like in the image forming apparatus 1 of FIG. 2.

Figure 11:
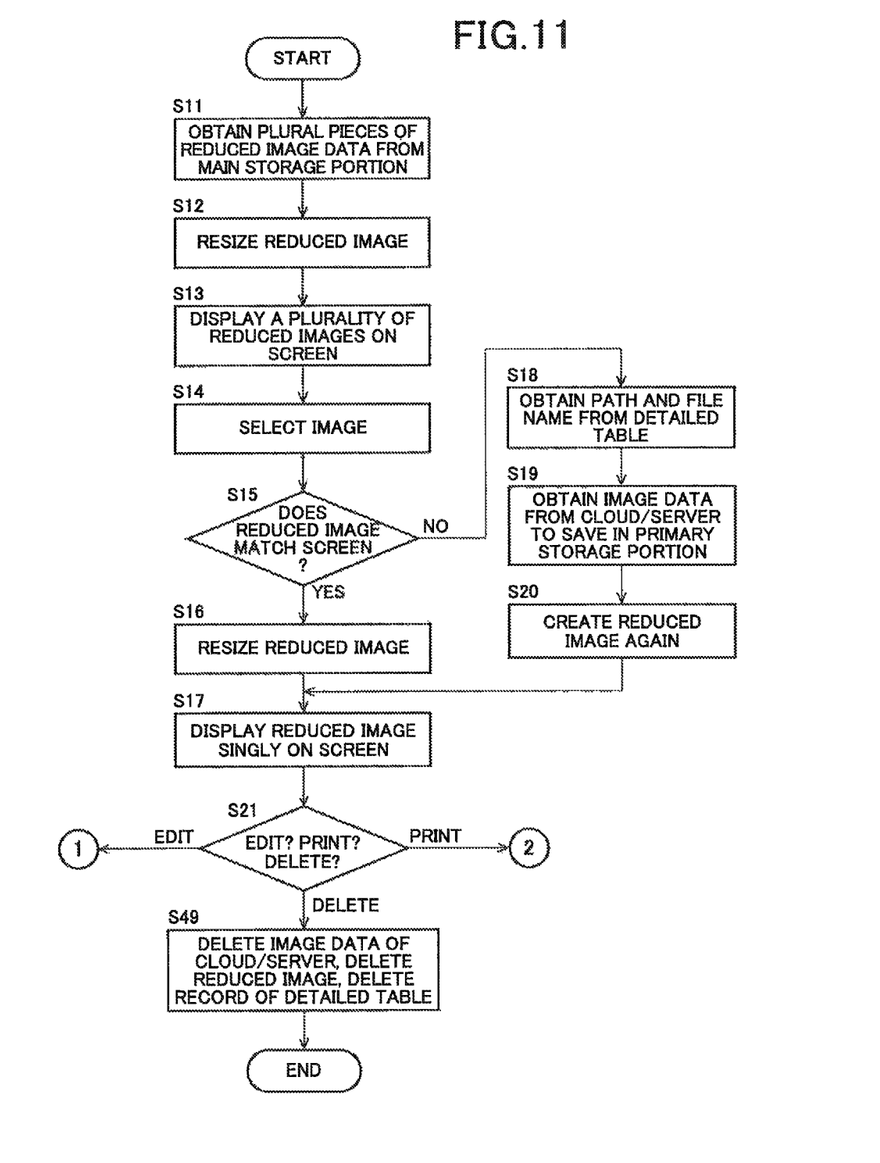
FIG. 11 is a flowchart explaining an example of a flow when image data to be printed or edited is selected in response to a user operation to perform printing, editing or the like in the image forming apparatus of FIG. 2.

The image forming apparatus 1, when receiving an operation of a browsing request of image data saved in the external storage device, obtains a plural pieces of reduced image data from the main storage portion 19 as shown in FIG. 11 (step S11), and generates a reduced image for each of them at the image processing portion 16, and resizes them to be adapted to a display area (step S12). Then, for example, the plurality of reduced images which are resized are displayed by performing processing such as displaying the selection screen P1 of FIG. 4 on the display portion 12 (step S13).

When a selection operation for any of the plurality of reduced images is received (step S14), whether or not the selected reduced image before resizing matches the display area of the display portion 12 is judged (step S15).

In the case of matching (in the case of YES at step S15), the reduced image based on the reduced image data stored in the main storage portion 19 is resized at the image processing portion 16 (step S16) and displayed singly on the display portion 12 (step S17).

In the case of not matching (in the case of NO at step S15), by referring to the detailed information table T of FIG. 3, path information and file name information at a saving destination linked with the selected reduced image (reduced image data) are obtained (step S18), and image data is received from the external storage device through the communication portion 18 based on these information and stored in the primary storage portion 17 (step S19). Then, the image forming apparatus 1 creates a reduced image matching the display area of the display portion 12 again based on the image data stored in the primary storage portion 17 to singly display on the display portion 12 (step S17).

Note that, single display of the reduced image is performed by performing processing such as displaying the screen P2 of FIG. 5.

Subsequent to step S17, the image forming apparatus 1 judges whether to perform printing processing, edit processing, or deletion processing as processing for the selected reduced image (step S21). This judgment is performed, for example, based on the operation for the buttons P23 to P25 on the screen P2 of FIG. 5.

Figure 12:
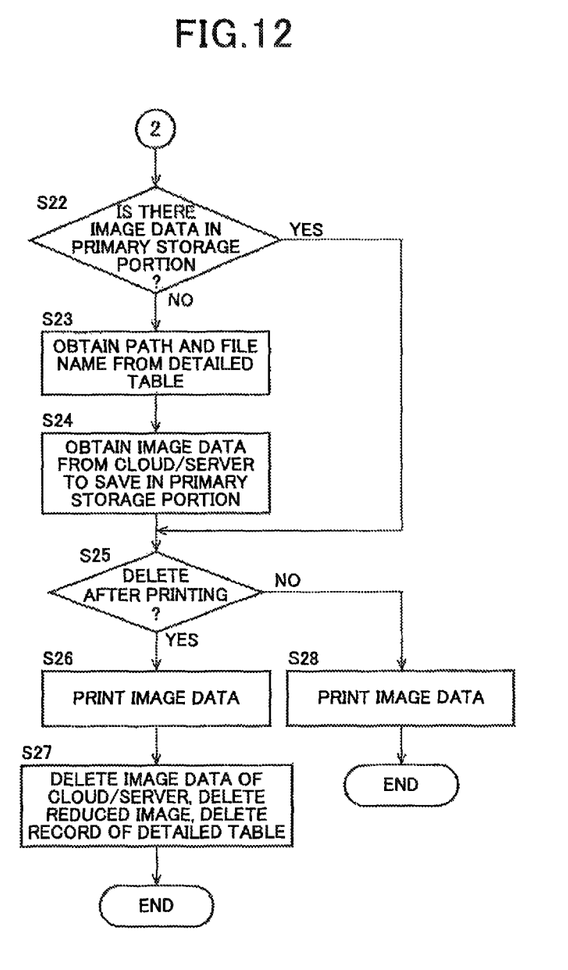
FIG. 12 is a flowchart explaining an example of a flow when image data to be printed or edited is selected in response to a user operation to perform printing, editing or the like in the image forming apparatus of FIG. 2.

When it is judged that printing processing is performed as the processing at step S21, that is, when the "print" button P23 on the screen P2 of FIG. 5 is operated, the image forming apparatus 1 judges whether or not image data to be processed has been already saved in the primary storage portion 17 as shown in FIG. 12 (step S22).

In the case of being saved (in the case of YES), the processing moves to step S25 without doing anything. On the other hand, in the case of not being saved (in the case of NO), by referring to the detailed information table T of FIG. 3, path information and file name information at a saving destination linked with the reduced image (reduced image data) selected at step S14 are obtained (step S23), and image data is received from the external storage device through the communication portion 18 based on these information and stored in the primary storage portion 17 (step S24), and thereafter the processing moves to step S25.

At step S25, the image forming apparatus 1 displays the screen P3 of FIG. 6, and judges whether or not to delete image data from the external storage device after printing of the image data based on the user operation of the buttons P33 and P34 on the screen P3.

When the "yes" button P33 on the screen P3 is operated and it is judged to perform deletion after printing (in the case of YES at step S25), printing processing is performed at the image forming portion 20 based on the image data stored in the primary storage portion 17 (step S26), and the image data subjected to the printing processing is deleted from the external storage device at the saving destination, a reduced image of the image data, that is, reduced image data is deleted from the main storage portion 19, and further information linked with the reduced image data, that is, record of the image in the detailed information table T of FIG. 3 is also deleted (step S27). At this time, the image data stored in the primary storage portion 17 for the printing processing is also deleted from the storage portion 17.

Moreover, when the "no" button P34 on the screen P3 is operated and it is judged not to perform deletion after printing (in the case of NO at step S25), the image forming apparatus 1 performs the printing processing at the image forming portion 20 based on the image data stored in the primary storage portion 17 (step S28). At this time, the image data subjected to the printing processing is not deleted from the external storage device at the saving destination but deleted from the primary storage portion 17.

Figure 13:
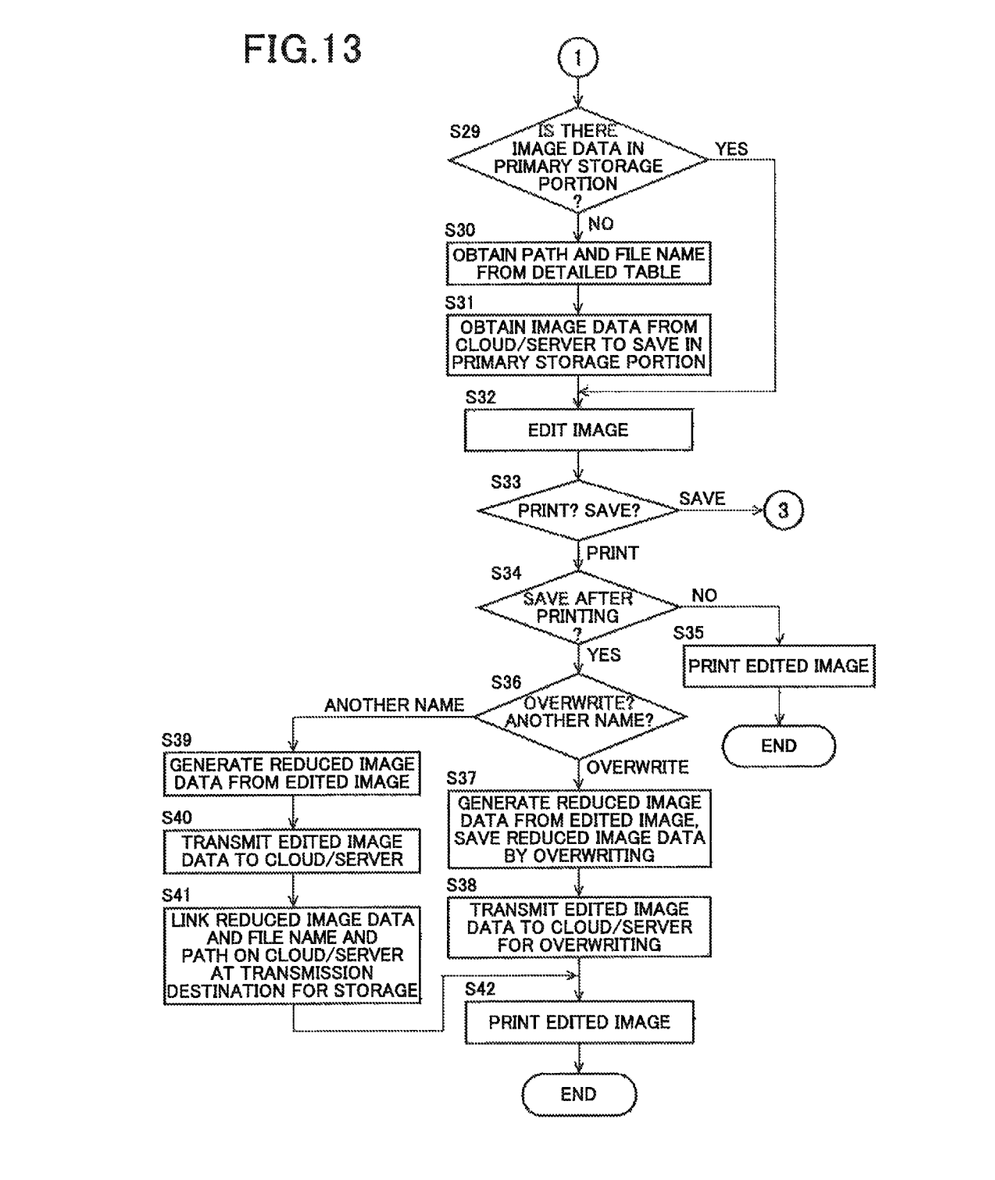
FIG. 13 is a flowchart explaining an example of a flow when image data to be printed or edited is selected in response to a user operation to perform printing, editing or the like in the image forming apparatus of FIG. 2.

When it is judged that edit processing is performed as the processing at step S21 of FIG. 11, that is, when the "edit" button P24 on the screen P2 of FIG. 5 is operated, the image forming apparatus 1 judges whether or not image data to be processed has been already saved in the primary storage portion 17 as shown in FIG. 13 (step S29).

In the case of being saved (in the case of YES), the processing moves to step S32 without doing anything. On the other hand, in the case of not being saved (in the case of NO), by referring to the detailed information table T of FIG. 3, path information and file name information at the saving destination linked with the reduced image (reduced image data) selected at step S14 are obtained (step S30), and image data is received from the external storage device through the communication portion 18 based on these information and stored in the primary storage portion 17 (step S31), and thereafter the processing moves to step S32.

At step S32, the image forming apparatus 1 receives an edit operation from the user and stores the edit content in the primary storage portion 17.

Subsequent to step S32, the image forming apparatus 1 judges whether the edit result is printed or saved (step S33). This judgment is performed, for example, based on the operation of the buttons P43 and P44 on the screen P4 of FIG. 7.

When it is judged to perform printing at step S33, that is, when the "print" button P43 on the screen P4 of FIG. 7 is operated, the image forming apparatus 1 displays the screen P5 of FIG. 8 on the display portion 12 and, after printing, judges whether or not to save the edit result after printing based on the user operation of the buttons P54 and P55 on the screen P5 (step S34).

When it is judged not to save the edit result after printing at step S34, that is, when the "no" button P54 on the screen P5 of FIG. 8 is operated, in the image forming apparatus 1, the image processing portion 16 generates data combining the edit content and the original image data stored in the primary storage portion 17, and based on the image data, printing processing is performed at the image forming portion 20 (step S35). Thereafter, the edit content and the original image data stored in the primary storage portion 17 are deleted from the primary storage portion 17.

Moreover, when it is judged to save the edit result after printing at step S34, that is, when the "yes" button P55 on the screen P5 of FIG. 8 is operated, the image forming apparatus 1 displays the screen P6 of FIG. 9 on the display portion 12, and judges whether to save the edit result by overwriting or as another name based on the user operation of the buttons P63 and P64 on the screen P6 (step S36).

When it is judged to save the edit result by overwriting at step S36, that is, when the "overwrite" button P63 on the screen P6 of FIG. 9 is operated, in the image forming apparatus 1, the image processing portion 16 newly generates reduced image data based on the data to save by overwriting current reduced image data stored in the main storage portion 19, as well as generating data combining the edit content and the original image data stored in the primary storage portion 17 (step S37). Moreover, the image forming apparatus 1 transmits the above-described combining data which is the edit result, namely the edited image data, to the external storage device through the communication portion 18 for saving by overwriting (step S38), and the processing moves to step S42.

When it is judged to save the edit result as another name at step S36, that is, when the "save as another name" button P64 on the screen P6 of FIG. 9 is operated, in the image forming apparatus 1, the image processing portion 16 newly generates reduced image data based on the data, as well as generating data combining the edit content and the original image data stored in the primary storage portion 17 (step S39). Moreover, the image forming apparatus 1 transmits the above-described combining data which is the edit result, namely the edited image data, to the external storage device through the communication portion 18 for saving as another name compared to the image data before edit (step S40). Further, the image forming apparatus 1 stores the reduced image data of the edit result by linking with file name and path information in the external storage device at a transmission destination, namely a saving destination, in the main storage portion 19 (step S41), and the processing moves to step S42.

At step S42, the image forming apparatus 1 performs printing processing of the edited image at the image forming portion 20 based on the edited image data.

Figure 14:
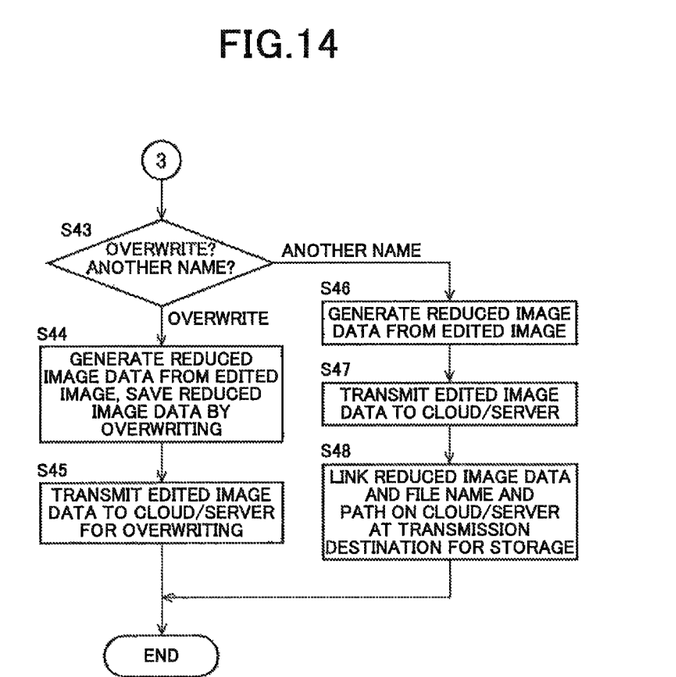
FIG. 14 is a flowchart explaining an example of a flow when image data to be printed or edited is selected in response to a user operation to perform printing, editing or the like in the image forming apparatus of FIG. 2.

Moreover, when it is judged to save the edit result at step S33, that is, when the "save" button P44 on the screen P4 of FIG. 7 is operated, the image forming apparatus 1 performs processing of steps S43 to S48 as shown in FIG. 14. Note that, the processing of steps S43 to S48 is the same as the processing of steps S36 to s41, respectively, so that description of which will be omitted.

The following description further explains FIG. 11.

When it is judged to perform deletion processing as the processing at step S21, that is, when the "delete" button P25 on the screen P2 of FIG. 5 is operated, the image forming apparatus 1 refers to the detailed information table T of FIG. 3, deletes the target image data from the external storage device at the saving destination, deletes a reduced image of the image data, namely the reduced image data, from the main storage portion 19, and further deletes information linked with the reduced image data, namely a record of the image, in the detailed information table T of FIG. 3 as well (step S49).

As described above, an image forming apparatus of the present invention includes a reading portion for reading a document, an image processing portion for creating image data of the read document, and a communication portion for transmitting the created image data to an external storage device connected through a network for saving, and obtains the image data saved in the external storage device in response to a user operation to perform required processing, in which a reduced image generating portion for creating reduced image data based on the created image data, a storage portion for linking the reduced image data with at least a saving destination of the image data serving as original of the reduced image data for storage, and a display portion for displaying an operation screen are included, and the reduced image data stored in the storage portion is displayed on the display portion to select image data on which the required processing is performed. This makes it possible to select image data to be processed promptly from image data saved in the external storage device without lacking user-friendliness.

The required processing is printing processing or edit processing.

Moreover, it may be configured such that the reduced image processing portion creates reduced image data based on image data on which the edit processing is performed, the communication portion transmits the image data on which the edit processing is performed to the external storage device for saving, and the reduced image storage portion links the created reduced image data and a saving destination of the image data on which the edit processing is performed and serves as original of the reduced image data for storage. This makes it possible to handle the edited data in the same manner as the read data.

Note that, whether or not to overwrite may be selectable when the image data on which the edit processing is performed and reduced image data thereof are saved and stored. Since there is a case where unedited original data is necessary or unnecessary depending on the edited image data, the structure described above makes it possible to deal with both cases.

It is also possible to perform printing processing on image data that has been subjected to the edit processing.

Moreover, a file name when the image data is saved in the external storage device may be generated to be unique. Since it is normally impossible to save the image data with the same file name, the structure described above makes it possible to prevent that.

It is also possible to delete the reduced image data and the image data saved in the external storage device in response to a user operation.

As above, according to the present invention, it is possible to provide an image forming apparatus which temporarily saves image data that a document is read in an external storage device before processing, and is capable of selecting image data to be processed promptly from image data saved in the external storage device without lacking user-friendliness.

The invention claimed is:

1. An image forming apparatus, comprising:
a reader configured or programmed to read a document,
an image processor configured or programmed to create image data of the read document,
a communicator configured or programmed to transmit the created image data to an external storage device connected through a network to be saved, and to obtain the image data saved in the external storage device in response to a user operation to perform edit processing,
a reduced image generator configured or programmed to create a thumbnail image based on the created image data,
a storage configured or programmed to store, when transmitting the created image data to the external storage device, the thumbnail image such that the thumbnail image is linked with at least a saving destination of the image data serving as an original of the thumbnail image, and
a display configured or programmed to display an operation screen, wherein
the display is configured or programmed to display the thumbnail image stored in the storage to select image data for which the edit processing is performed,
the communicator is configured or programmed to obtain the image data which is the original of the thumbnail image saved in the external storage device,
the image processor is configured or programmed to create edit image data based on the original of the thumbnail image and an edit operation from a user,
the reduced image generator is configured or programmed to create a new thumbnail image based on the edited image data,
the communicator is configured or programmed to transmit the edited image data to the external storage device to be saved, and
the storage is configured or programmed to store the new thumbnail image such that the new thumbnail image is linked with at least a saving destination of the edited image data serving as an original of the new thumbnail image.

2. The image forming apparatus according to claim 1, wherein
whether or not to overwrite is selectable when the edited image data and the new thumbnail image are saved and stored.

* * * * *